(12) United States Patent
Ness

(10) Patent No.: US 8,336,450 B1
(45) Date of Patent: Dec. 25, 2012

(54) ICE JACKETED COOKING POT

(76) Inventor: Daniel Ness, Metairie, LA (US)

( * ) Notice: Subject to any disclaimer, the term of this patent is extended or adjusted under 35 U.S.C. 154(b) by 226 days.

(21) Appl. No.: 12/730,893

(22) Filed: Mar. 24, 2010

Related U.S. Application Data

(60) Provisional application No. 61/162,700, filed on Mar. 24, 2009.

(51) Int. Cl.
*A47J 27/02* (2006.01)
*G07F 9/10* (2006.01)
*B65D 83/72* (2006.01)

(52) U.S. Cl. .................... 99/357; 220/592.28; 220/573.3

(58) Field of Classification Search ............. 220/592.28, 220/592.03, 592.02, 630, 628, 573.3, 573.1, 220/912, 254.2, 254.6, 254.3, 826, 810, 23.83, 220/23.8, 23.2, 601, 500, 592.01; 99/407, 99/403, 340, 339, 357, 484; 248/188, 188.1, 248/151; *A47J 27/02, 27/10*
See application file for complete search history.

(56) References Cited

U.S. PATENT DOCUMENTS

| | | | |
|---|---|---|---|
| 783,973 A | 6/1868 | Klee et al. | |
| 100,863 A | 3/1870 | Corbett | |
| 133,679 A * | 12/1872 | Stoll | 220/592.28 |
| 161,092 A * | 3/1875 | Bates | 220/573.1 |
| 678,460 A * | 7/1901 | Dressler | 220/592.22 |
| 707,849 A * | 8/1902 | Kracker et al. | 220/634 |
| 1,038,393 A | 9/1912 | Koppmann | |
| 1,218,823 A | 3/1917 | Woina | |
| 1,272,222 A | 7/1918 | Clayton | |
| 1,332,019 A | 2/1920 | Allison | |
| 1,485,602 A | 3/1924 | Fleischer | |
| 1,654,175 A * | 12/1927 | Kitzeman | 122/14.21 |
| 2,622,590 A * | 12/1952 | Corbet et al. | 126/378.1 |
| 2,795,349 A * | 6/1957 | Cawood | 220/826 |
| 3,174,728 A * | 3/1965 | Mack | 366/213 |
| 3,460,718 A * | 8/1969 | Plant | 222/143 |
| 4,609,120 A * | 9/1986 | Lauer et al. | 220/605 |
| 6,185,942 B1 | 2/2001 | Werrbach, III et al. | |
| 6,772,912 B1 * | 8/2004 | Schall et al. | 222/143 |

* cited by examiner

*Primary Examiner* — Mickey Yu
*Assistant Examiner* — Robert J Hicks
(74) *Attorney, Agent, or Firm* — Garvey, Smith, Nehrbass & North, L.L.C.; Charles C. Garvey, Jr.; Vanessa M. D'Souza

(57) ABSTRACT

An ice jacketed cooking apparatus provides a base that supports a plurality of legs that hold a cooking pot at an elevated position above the base. This enables conventional burners to be placed underneath the pot and upon the base during cooking period. A jacket surrounds the cooking pot and enables ice and water to be held in close proximity to the cooking pot and around the cooking pot at a selected time after cooking is completed. The ice enables spicy liquid such as pepper or salt infused water to be cooled quickly without diluting the pepper or spice or salt infused water after cooking is completed.

20 Claims, 4 Drawing Sheets

US 8,336,450 B1

ICE JACKETED COOKING POT

CROSS-REFERENCE TO RELATED APPLICATIONS

Priority of U.S. Provisional Patent Application Ser. No. 61/162,700, filed 24 Mar. 2009, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to the cooking of food items with a heated spicy water cooking medium, wherein a jacket surrounds the food holding part of the apparatus, the ice enabling a quick cooling of the cooking medium without diluting the cooking medium and wherein separate drain lines enable either the ice holding compartment or the food holding compartment to be drained without a dilution of the cooking medium.

2. General Background of the Invention

One of the common methods of cooking a product in an outdoor environment is to employ a burner that is fueled with a canister of butane or propane or other like fuel. Such devices have been in use for in excess of fifty years.

Outdoor cooking devices have been used to cook various food items including shrimp, crabs, crawfish, and other food items. It is common to fill these pots with water, to add spicy products such as pepper, salt, and the like, and to bring that liquid medium to a boil.

After the liquid medium reaches a boil or near boil, the food product is added and cooked until it is in an edible state. With certain shellfish (e.g. shrimp), some cooks like to quickly cool the liquid medium that is used to cook the food product in hopes that the food product is not overcooked. With shrimp, overcooking causes the shell to stick to the edible food part. Peeling is then a laborious task.

In the past, cooks have added ice to the pot containing the food product in order to quickly lower the temperature of the water. However, adding ice dilutes the liquid cooking medium and can thus have an ill affect on the taste of the product being cooked.

The present invention provides and ice jacketed cooking apparatus that enables ice to be placed around the vessel that is cooking the food product, the ice quickly cooling the food product while not mixing with the spices that are used to cook the food product.

The following possibly relevant U.S. Patents relate to cooking and pots and are incorporated herein by reference:

TABLE

| PAT. NO. | TITLE | ISSUE DATE MM-DD-YYYY |
|---|---|---|
| 78,973 | Mash Tub | 06-16-1868 |
| 100,863 | Domestic Boiler | 03-15-1870 |
| 1,038,393 | Cooker | 09-10-1912 |

TABLE-continued

| PAT. NO. | TITLE | ISSUE DATE MM-DD-YYYY |
|---|---|---|
| 1,218,823 | Culinary Boiler | 03-13-1917 |
| 1,272,222 | Cooking Vessel | 07-09-1918 |
| 1,332,019 | Culinary Utensil | 02-24-1920 |
| 1,485,602 | Cooking Utensil | 03-04-1924 |
| 6,185,942 | Rapid Food Cooling Apparatus and Method of Use | 02-13-2001 |

BRIEF SUMMARY OF THE INVENTION

A cooking apparatus provides a frame having a base that can be provided with sockets which are receptive of the tines of a forklift. Legs on the frame support a pot holder.

A pot assembly removably attaches to the pot holder. The assembly includes an inner pot for holding a first fluid that is a cooking medium and a jacket that surrounds the first pot, wherein a gap is provided in between the jacket and the first pot to provide a jacketed space for holding ice and/or cooling fluid.

A first flow line enables the first pot to be drained via gravity. A second flow line enables the space to be drained via gravity.

The flow lines enable a draining of either the first pot or the jacketed space independently of the other.

In one embodiment, the flow lines are separate so that the cooking medium and the ice/water do not commingle within the first pot.

In one embodiment, at least one of the flow lines has a valve. Each of the flow lines can have a valve.

In one embodiment, the first pot has a top and a bottom and the jacket extends from a position next to the top of the first pot to a position next to the bottom of the first pot.

In one embodiment, one of the flow lines enables a draining of the jacketed space without draining the cooking medium from the first pot.

In one embodiment, the first pot has a bottom wall and a side wall and the jacket is attached to the side wall.

In one embodiment, the first pot has a bottom wall and a side wall and the jacket is attached to the bottom wall.

In one embodiment, the pot has one or more lids.

In one embodiment, there are a pair of lids, each pivotally attached to the first pot.

In one embodiment, a frame is provided having a base. The frame includes a pot holder. A pot assembly is removably supportable on the pot holder, the assembly including an inner pot for holding a first fluid that is a cooking medium and an outer pot in the form of a jacket that is on the outside surface of the inner pot. A gap is provided in between the jacket and the inner pot to provide a space for holding ice, water, and/or other cooling material.

In one embodiment, at least one flow line is provided for draining either the cooking medium or the cooling medium such as water or other liquid coolant.

DETAILED DESCRIPTION OF THE INVENTION

Figure 1:
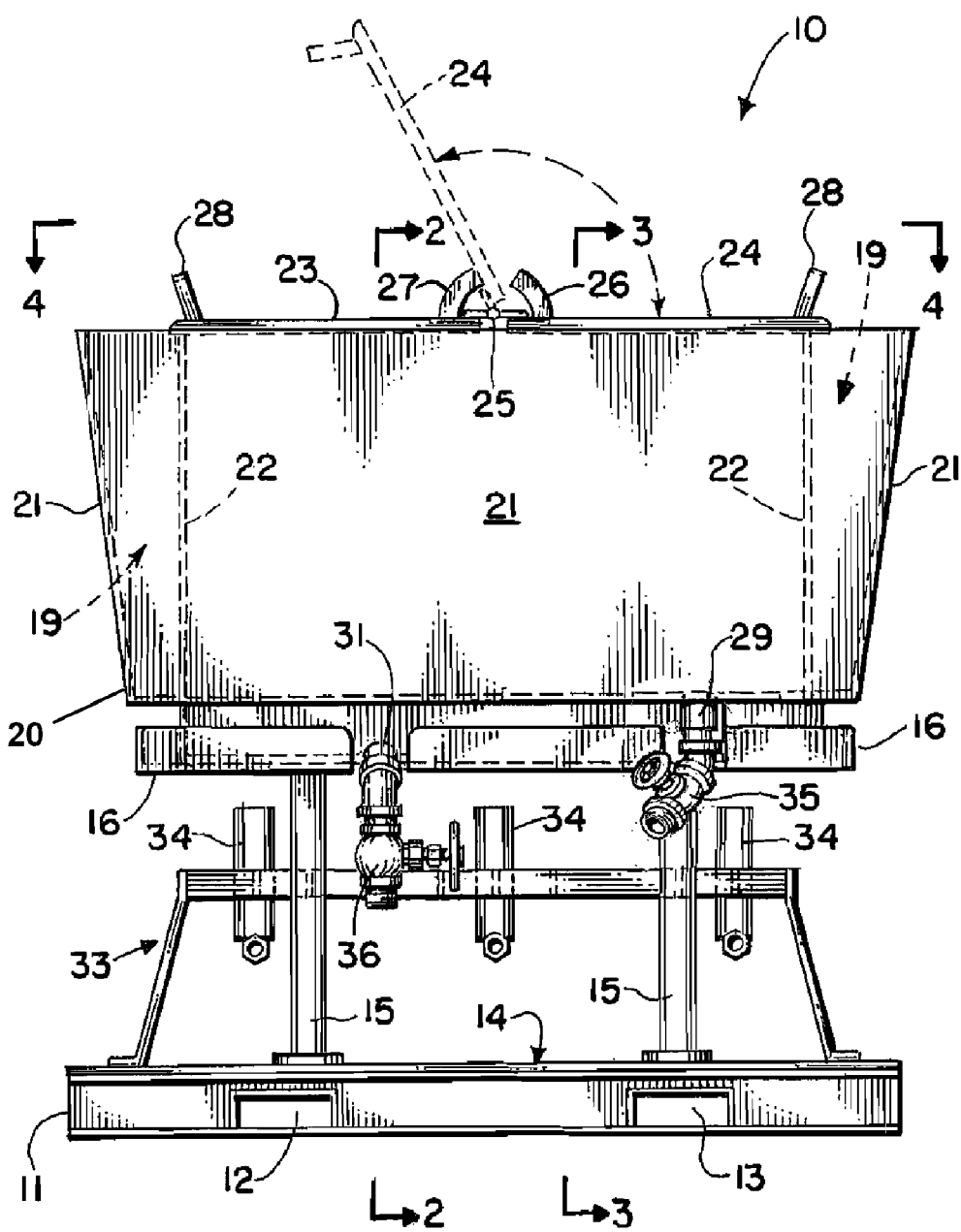
FIG. 1 is an elevation view of the preferred embodiment of the apparatus of the present invention.
Figure 2:
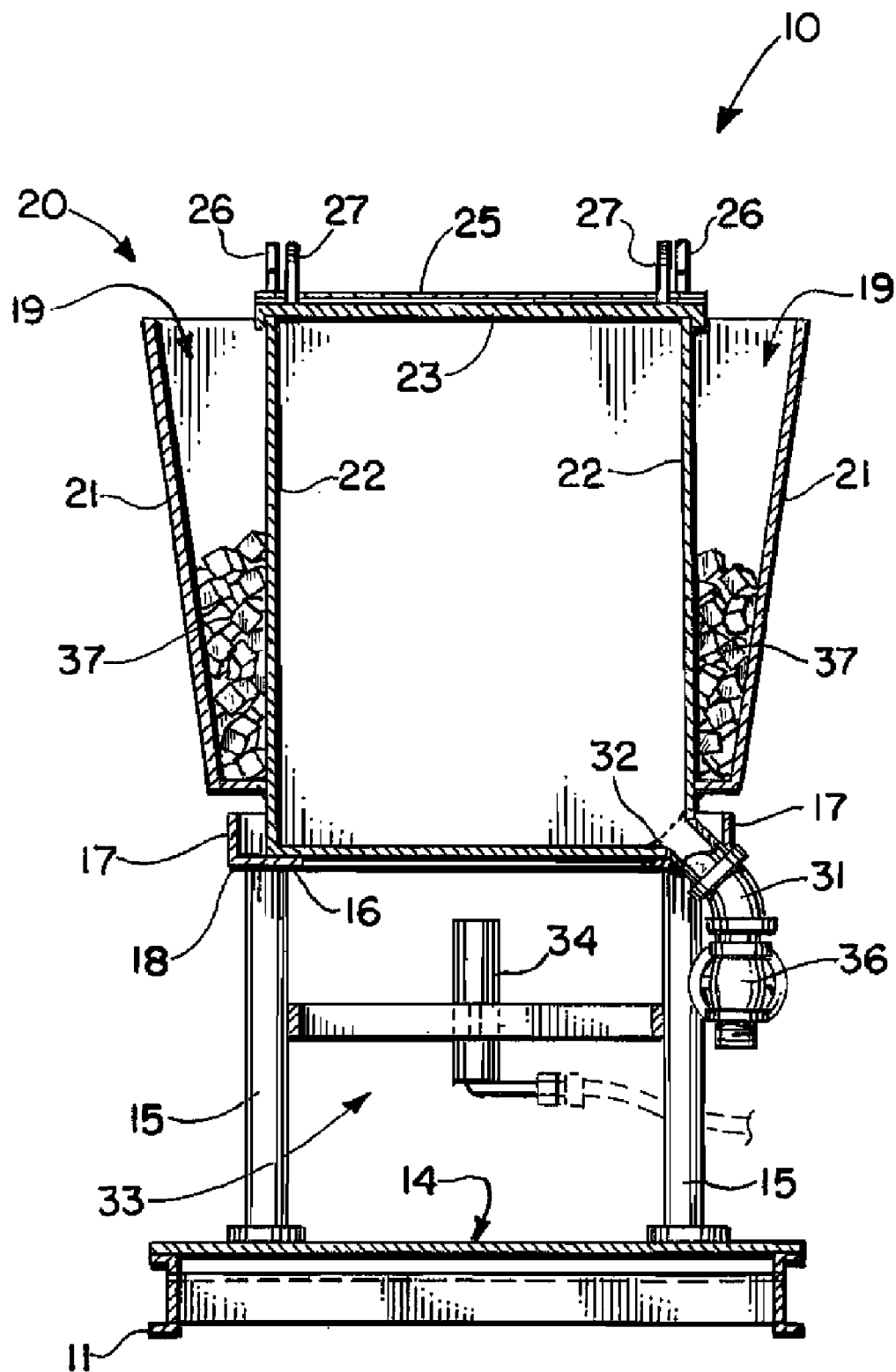
FIG. 2 is a sectional view of the preferred embodiment of the apparatus of the present invention, taken along lines 2-2 of FIG. 1.
Figure 3:
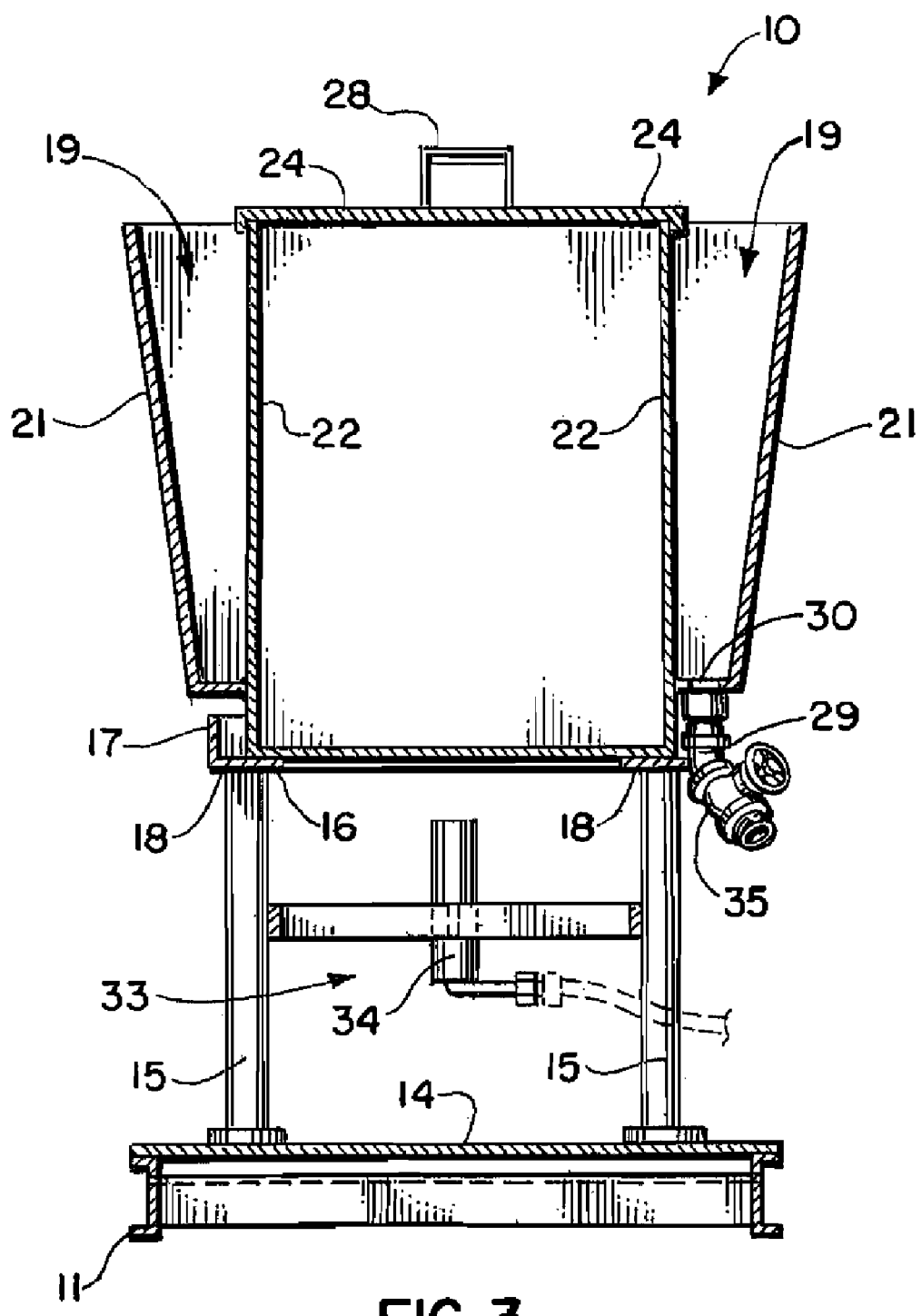
FIG. 3 is a sectional view of the preferred embodiment of the apparatus of the present invention, taken along lines 3-3 of FIG. 1.

FIGS. 1-3 show the preferred embodiment of the apparatus of the present invention designated drawing by 10. Ice jacketed cooker 10 provides a base 11 that can be in the nature of a structural frame of welded steel, for example. The base 11 can provide spaced apart sockets 12, 13 that are receptive of forklift tines. Thus, a user can use a fork lift to lift the base 11 and also to lift the cooking vessel 20 that rests upon the base 11 as shown in FIG. 1.

Base 11 provides an upper surface 14 that can be flat such as for example check plate steel. A plurality of legs 15 rest upon upper surface 14 of base 11. The legs 15 are connected to a pot holding beam or frame 16. The frame 16 can include vertical 17 and horizontal 18 sections for supporting a cooking vessel 20.

Cooking vessel 20 has an outer jacket 21. There is a gap 19 in between jacket 21 and pot 22. Gap 19 enables holding of ice 37 or like cooling material.

Figure 4:
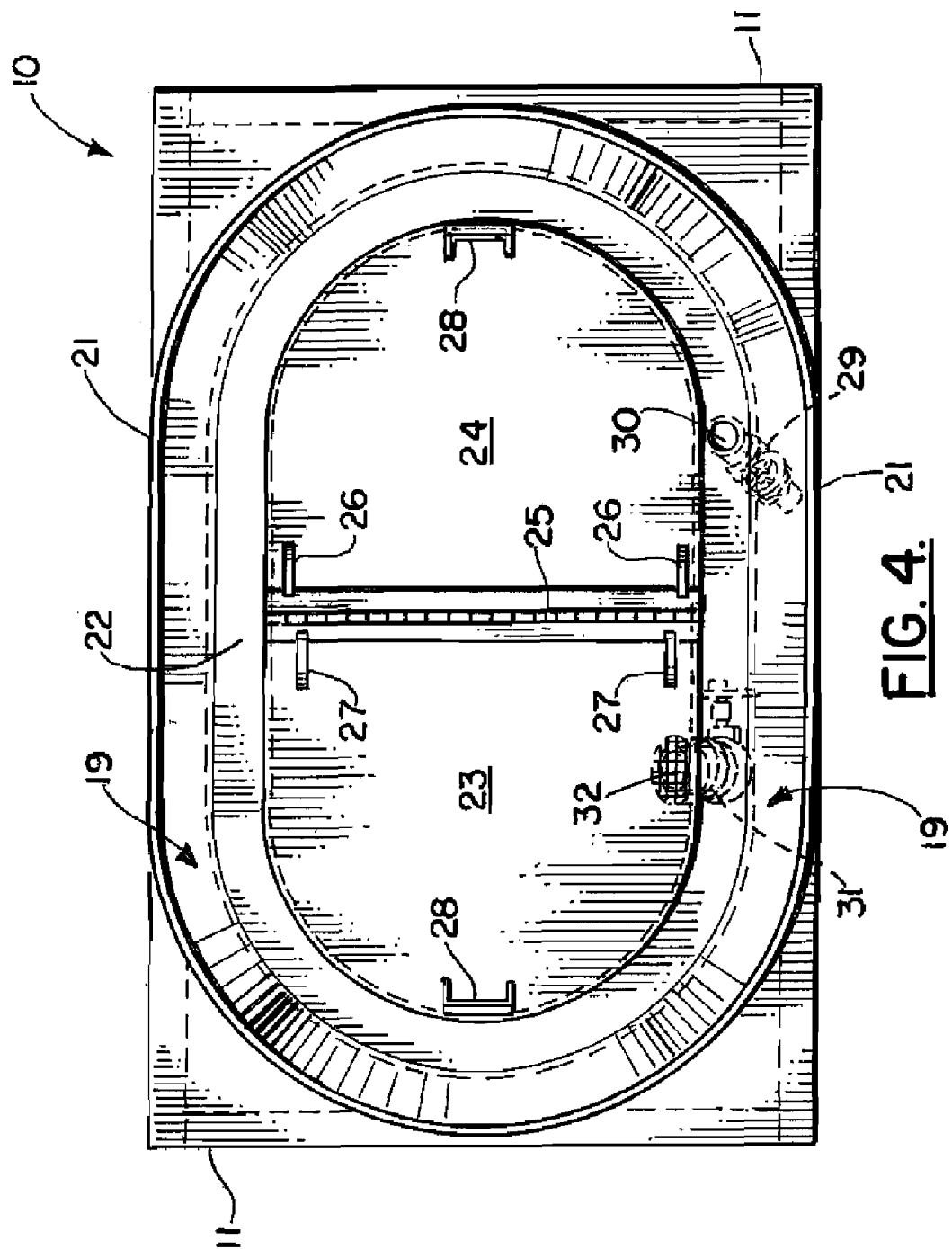
FIG. 4 is a top, plan view of the preferred embodiment of the apparatus of the present invention, taken along lines 4-4 of FIG. 1.

Cooking vessel 20 employs a pot 22 that can be cylindrically shaped or oval shaped as shown. One or more lids 23, 24 are provided, each lid 23, 24 being pivotally attached to pot 22 with a hinge or hinges 25. The hinge 25 can be a common hinge that pivotally attaches one lid 23 to the other lid 24 (see FIG. 4).

Each lid, 23, 24 can provide one or more stop plates 26, 27 for limiting the degree of opening of a lid 23, 24. In FIG. 1 for example, lid 24 has been opened about 100 degrees relative to pot 22. The degree of opening of lid 23 is determined by a pair of stop plates 26 which prevent further opening of the lid 23. Similarly, lid 24 is fitted with a pair of stop plates 27. Handles 28 enable either of the lids 23, 24 to be opened or closed.

Discharge pipes are provided for selectively emptying: 1) the pot 22 of cooking medium, or 2) water that has collected in the gap 19 between jacket 21 and pot 22. A first discharge pipe 29 extends from outlet 30 for draining water from the space or gap 19 in between jacket 21 and pot 22.

A second discharge pipe 31 communicates with outlet 32 for draining liquid cooking medium from pot 22 after cooking has been completed. Each of the outlets and discharge pipes can be provided with a valve 35 or 36 (e.g., gate valve or plug valve) for controlling the flow of fluid from outlet 30 or outlet 32. In this fashion, water can be continuously drained as the ice 37 in gap 19 melts. Valve 35 could be opened after cooling is complete.

A space 33 is provided in between upper surface 14 and pot 22. This space 33 can be used to position burners 34 (e.g. commercially available burners) under pot 22 and above surface 14 of base 11. After cooking is completed, a fork lift can be used to move the entire apparatus 10 by inserting the fork lift tines into the sockets 12, 13 respectively.

The following is a list of parts and materials suitable for use in the present invention.

PARTS LIST

| Part Number | Description |
| --- | --- |
| 10 | ice jacketed cooker |
| 11 | base |
| 12 | socket |
| 13 | socket |
| 14 | upper surface |
| 15 | leg |
| 16 | pot holding beam/frame |
| 17 | vertical section |
| 18 | horizontal section |
| 19 | gap/space |
| 20 | cooking vessel |
| 21 | jacket |
| 22 | pot |
| 23 | lid |
| 24 | lid |
| 25 | hinge |
| 26 | stop plate |
| 27 | stop plate |
| 28 | handle |
| 29 | discharge pipe |
| 30 | outlet |
| 31 | discharge pipe |
| 32 | outlet |
| 33 | space |
| 34 | burner |
| 35 | valve |
| 36 | valve |
| 37 | ice |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A cooking apparatus, comprising:
a) a frame having a base with sockets that are receptive of fork lift tines;
b) legs on the frame that support a pot holder;
c) a pot assembly removably supportable on the pot holder, the pot assembly including an inner pot for holding a first fluid that is a cooking medium;
d) the pot assembly including a jacket that is attached to and that surrounds the inner pot, the jacket being spaced away from the inner pot side wall to provide a gap in between the jacket and first pot for holding ice;
e) a first flowline that enables the inner pot to be drained via gravity;
f) a second flowline that enables the space in between the jacket and inner pot to be drained via gravity as the ice melts;
g) wherein the flowlines enable a draining of either the inner pot or the jacketed space independently of the other;
h) a burner element supported upon the frame below the inner pot bottom, the burner element positioned so that it heats the cooking medium in the inner pot; and
i) wherein the jacket is spaced radially away from the burner element.

2. The cooking apparatus of claim 1 wherein the flowlines are separate so that the cooking medium and the ice do not commingle within the inner pot.

3. The cooking apparatus of claim 1 wherein at least one of the flowlines has a valve.

4. The cooking apparatus of claim 1 wherein each of the flowlines has a valve.

5. The cooking apparatus of claim 1 wherein the inner pot has a top and a bottom and the jacket extends from a position next to the top of the inner pot to a position next to the bottom of the inner pot.

6. The cooking apparatus of claim 1 wherein one of the flowlines enables a draining of the jacketed space without draining the cooking medium from the inner pot.

7. The cooking apparatus of claim 1 wherein the inner pot has a bottom wall and a side wall and the jacket is attached to the side wall.

8. The cooking apparatus of claim 1 wherein the inner pot has a bottom wall and a side wall and the jacket is attached to the bottom wall.

9. The cooking apparatus of claim 1 wherein the first pot has a pair of lids that are pivotally attached to the first pot.

10. A cooking apparatus, comprising:
  a) a frame having a base;
  b) the frame including a pot holder;
  c) a pot assembly removably supportable on the pot holder, the pot assembly including an inner pot for holding a first fluid that is a cooking medium, the inner pot having a bottom wall and a side wall;
  d) the pot assembly including a jacket that is attached to and that that surrounds the inner pot, a gap in between the jacket and inner pot being a jacketed space for holding ice;
  e) an inner flowline that enables the inner pot to be drained via gravity;
  f) a second flowline that enables the jacketed space to be drained via gravity;
  g) wherein the flowlines enable a draining of either the inner pot or the jacketed space independently of the other;
  h) a burner element supported upon the frame below the inner pot bottom, the burner element positioned so that it heats the cooking medium in the inner pot;
  i) wherein the jacket is attached to the inner pot side wall at a position that is spaced radially away from the burner element; and
  j) wherein the jacket is attached to the inner pot sidewall at an elevation that is above the inner pot bottom.

11. The cooking apparatus of claim 10 wherein the flowlines are separate so that the cooking medium and the ice do not commingle within the inner pot.

12. The cooking apparatus of claim 10 wherein at least one of the flowlines has a valve.

13. The cooking apparatus of claim 10 wherein each of the flowlines has a valve.

14. The cooking apparatus of claim 10 wherein the inner pot has a top and a bottom and the jacket extends from a position next to the top of the inner pot to a position next to the bottom of the inner pot.

15. The cooking apparatus of claim 10 wherein one of the flowlines enables a draining of the jacketed space without draining the cooking medium from the inner pot.

16. The cooking apparatus of claim 10 wherein the inner pot has a bottom wall and a side wall and the jacket is attached to the side wall.

17. The cooking apparatus of claim 10 wherein the inner pot has a bottom wall and a side wall and the jacket is attached to the bottom wall.

18. The cooking apparatus of claim 10 wherein the inner pot has a pair of lids that are pivotally attached to the first pot.

19. A cooking apparatus, comprising:
  a) a frame having a base;
  b) the frame including a pot holder;
  c) a pot assembly removably supportable on the pot holder, the assembly including an inner pot for holding a first fluid that is a cooking medium;
  d) the pot assembly including a jacket that is attached to and that surrounds the inner pot, a gap in between the jacket and inner pot being a jacketed space for holding ice;
  e) wherein one or more flowlines enables a draining of either the cooking medium or the water from the ice that melts independently of the other;
  f) a burner element on the frame below the inner pot; and
  g) the jacket being radially spaced away from the burner element.

20. The cooking apparatus of claim 19 further comprising a pair of lids with stop plates that are pivotally attached to the inner pot.

* * * * *